INVENTOR.
Jay M. Eitel

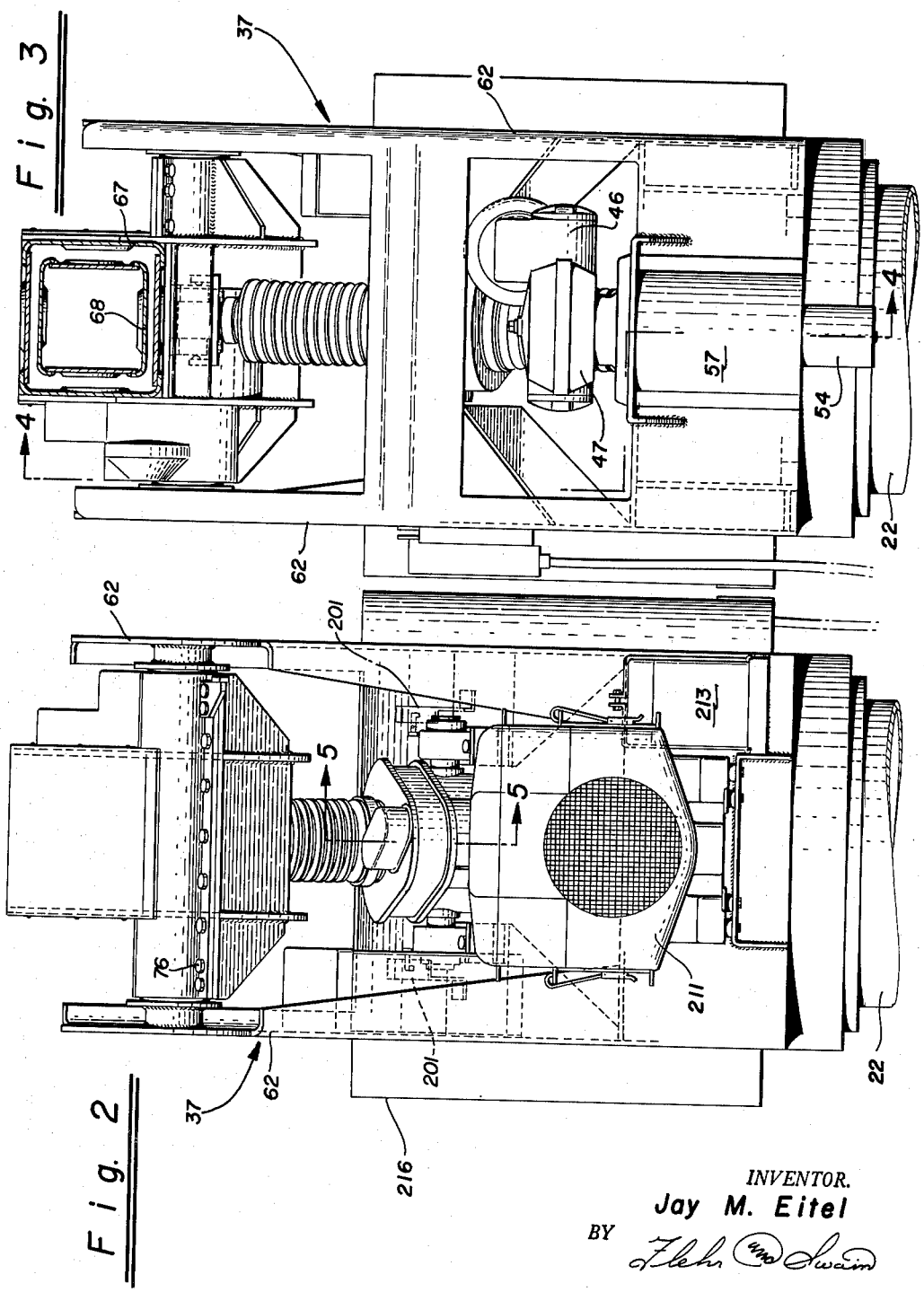

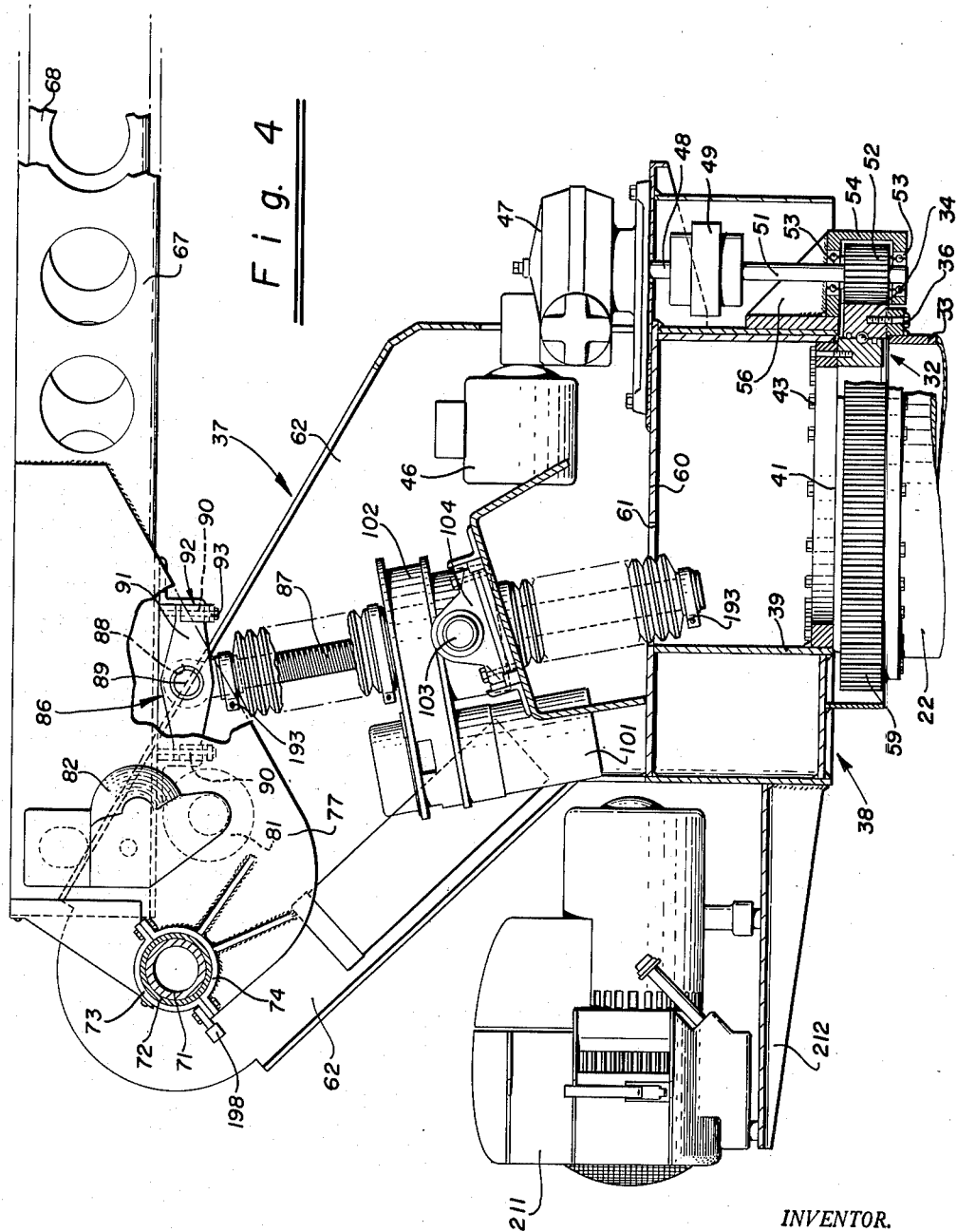

Sept. 7, 1965  J. M. EITEL  3,204,720
LIFTING EQUIPMENT
Filed July 3, 1961  7 Sheets-Sheet 5
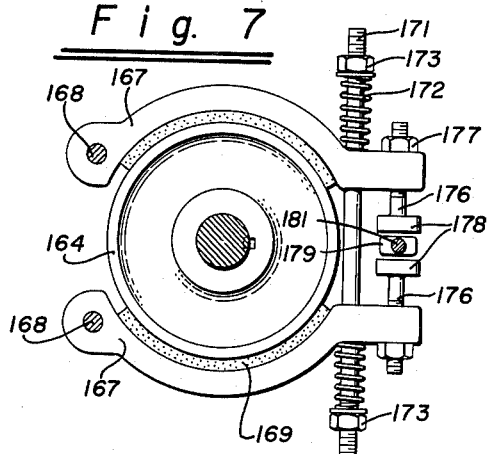
Fig. 7
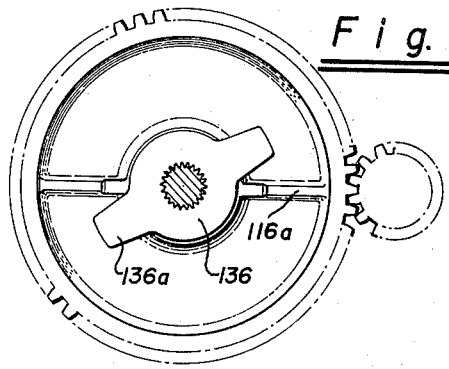
Fig. 9
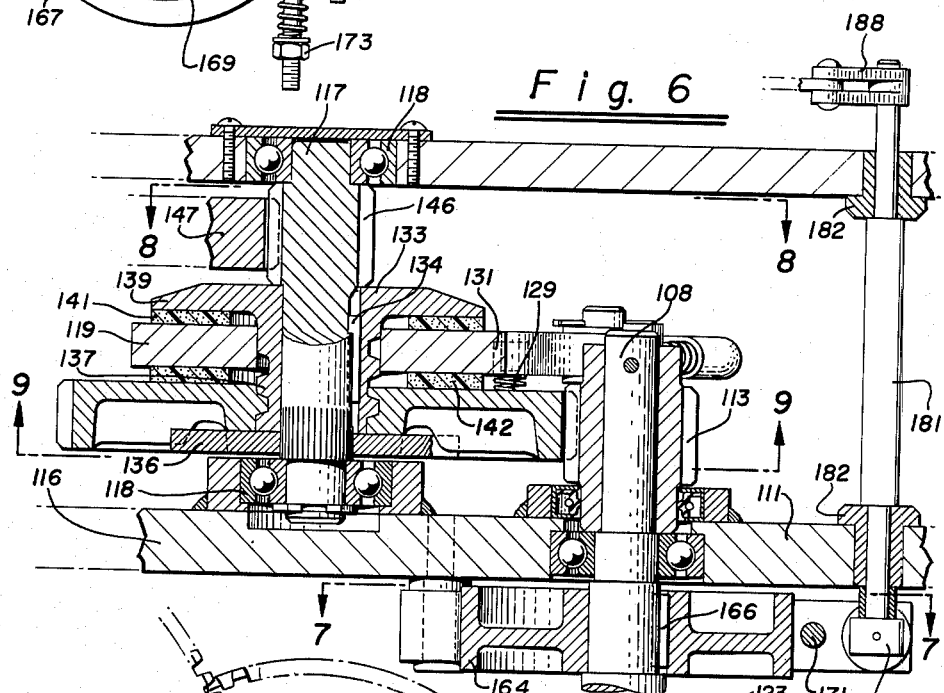
Fig. 6
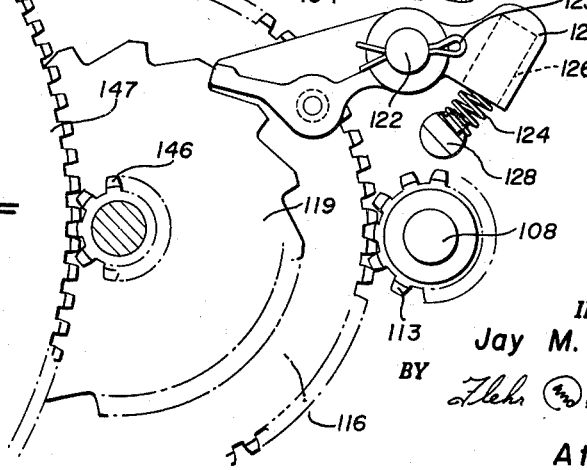
Fig. 8
INVENTOR.
Jay M. Eitel
BY
Attorneys

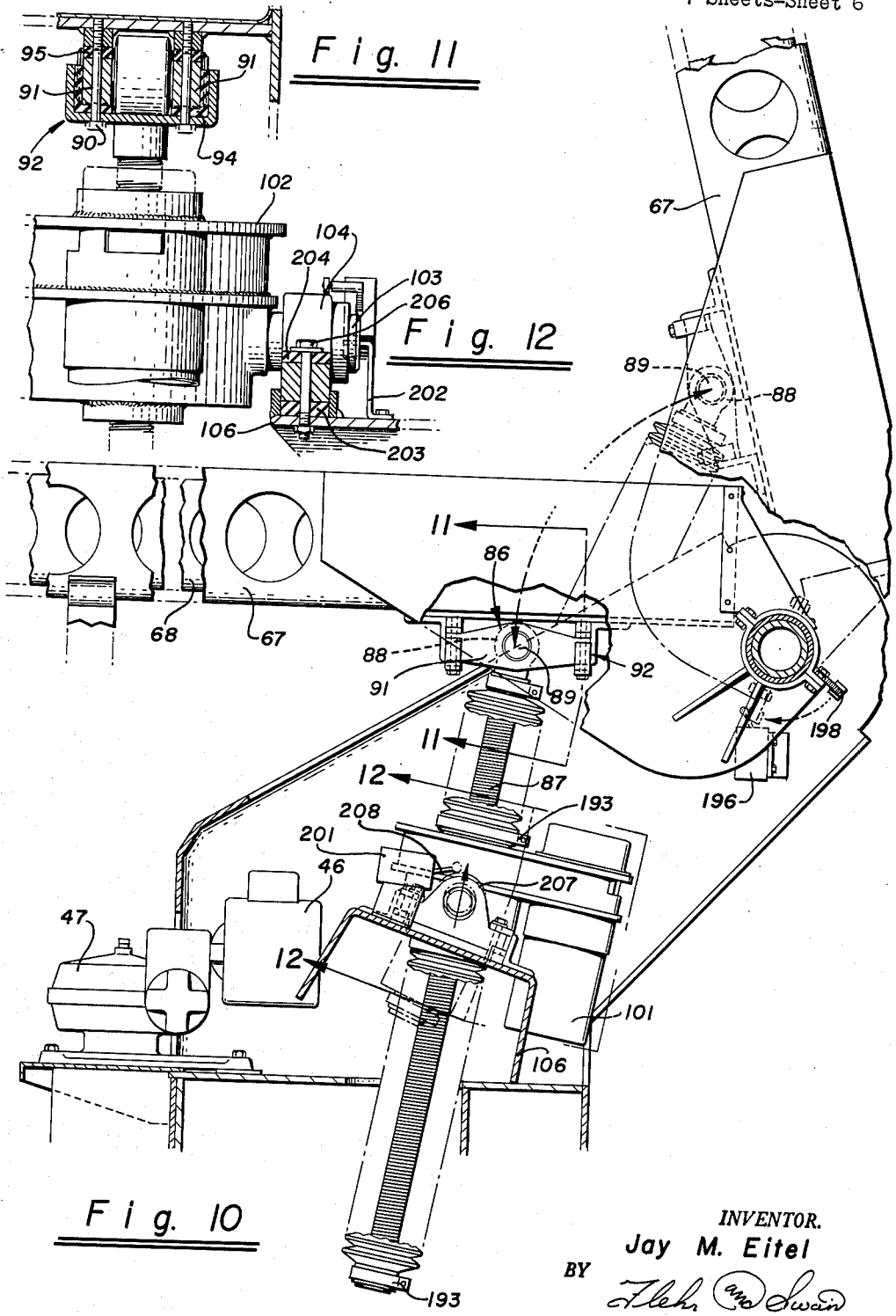

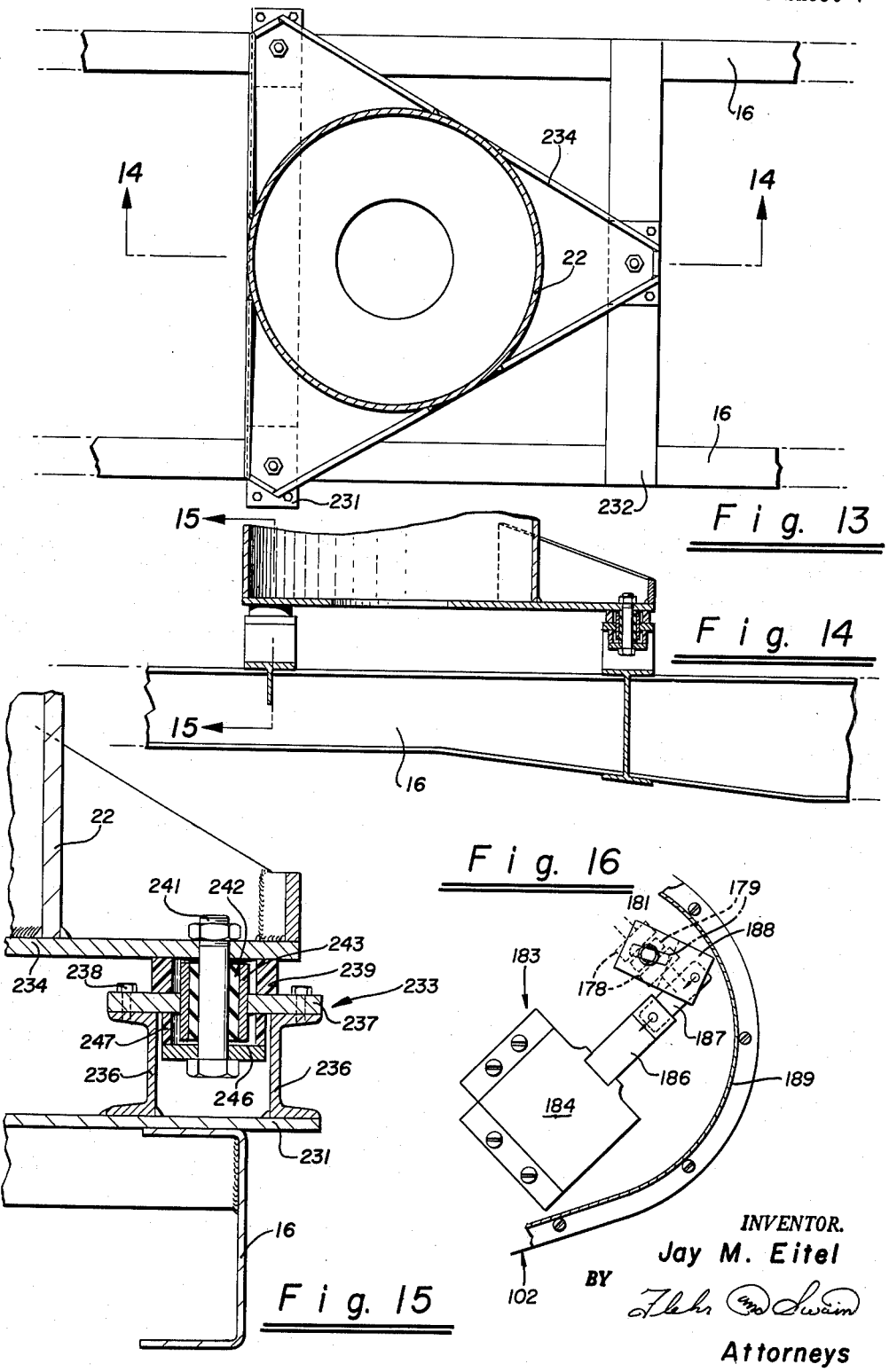

United States Patent Office 3,204,720
Patented Sept. 7, 1965

3,204,720
LIFTING EQUIPMENT
Jay M. Eitel, Los Altos, Calif., assignor to Telsta Corp., San Carlos, Calif., a corporation of California
Filed July 3, 1961, Ser. No. 121,535
13 Claims. (Cl. 182—19)

This invention relates to a lifting equipment and more particularly to a lifting equipment which is particularly adapted to be mounted on a wheeled vehicle.

Certain types of lifting equipment heretofore on the market such as the type disclosed in my Patent No. 2,936,847 have a disadvantage in that a portion of the extensible boom structure must serve as a lever arm for raising and lowering of the boom structure about a horizontal axis. This has a distinct disadvantage when it is desired to build equipment which can be extended to very high elevations, or, for example, above 50 feet above the ground. There is, therefore, a need for a new and improved lifting equipment for use with extensible boom structures which permits full use of the entire length of the boom structure.

In general, it is an object of the present invention to provide a lifting equipment in which the entire length of an extensible boom structure can be utilized for reaching a high elevation.

Another object of the invention is to provide a lifting equipment of the above character in which the entire length of the boom structure is utilized to maximum advantage.

Another object of the invention is to provide a lifting equipment of the above character which utilizes a ball screw jack for raising and lowering the boom structure about a horizontal axis.

Another object of the invention is to provide a lifting equipment of the above character in which particularly novel means is utilized for driving the ball screw jack.

Another object of the invention is to provide a lifting equipment of the above character in which safety means is provided for holding the boom structure at any desired elevation between its uppermost and lowermost positions.

Another object of the invention is to provide a lifting equipment of the above character in which means is provided for limiting the uppermost movement of the boom structure.

Another object of the invention is to provide a lifting equipment of the above character in which saftey means is provided for rendering inoperative the means for driving the ball screw jack assembly when the boom structure engages an object during its downward movement.

Another object of the invention is to provide a lifting equipment of the above character in which means is provided for resiliently mounting the lifting equipment to reduce brinelling of the bearings.

Another object of the invention is to provide a lifting equipment of the above character in which a three-point suspension is provided to avoid excessive stressing of the frame upon which the lifting equipment is mounted.

Another object of the invention is to provide a lifting equipment of the above character which is readily accessible for maintenance and repair.

Additional objects and features of the invention will appear from the following description in which the preferred embodiments are set forth in detail in conjunction with the accompanying drawings.

Referring to the drawings:

FIGURE 2 is a rear elevational view looking along the line 2—2 of FIGURE 1.

FIGURE 3 is a cross-sectional view taken along the line 3—3 of FIGURE 1.

FIGURE 4 is an enlarged detailed view partially in cross-section of the lifting equipment.

FIGURE 6 is another enlargement of the nut driving gear assembly partly in cross-section and with certain parts broken away.

FIGURE 7 is a cross-sectional view looking along the line 7—7 of FIGURE 6.

FIGURE 8 is a cross-sectional view looking along the line 8—8 of FIGURE 6.

FIGURE 9 is a cross-sectional view looking along the line 9—9 of FIGURE 6.

FIGURE 10 is an enlarged detail view of a portion of a lifting equipment.

FIGURE 11 is a cross-sectional view taken along the line 11—11 of FIGURE 10.

FIGURE 12 is a cross-sectional view taken along the line 12—12 of FIGURE 10.

FIGURE 13 is a plan view partially in cross-section of a three point suspension for the lift supporting structure to reduce stresses to the frame of the vehicle in which the lift supporting equipment is mounted.

FIGURE 14 is a cross-sectional view taken along the line 14—14 of FIGURE 13.

FIGURE 15 is a cross-sectional view taken along the line 15—15 of FIGURE 14.

FIGURE 16 is a cross-sectional view looking along the line 16—16 of FIGURE 5.

Figure 1:
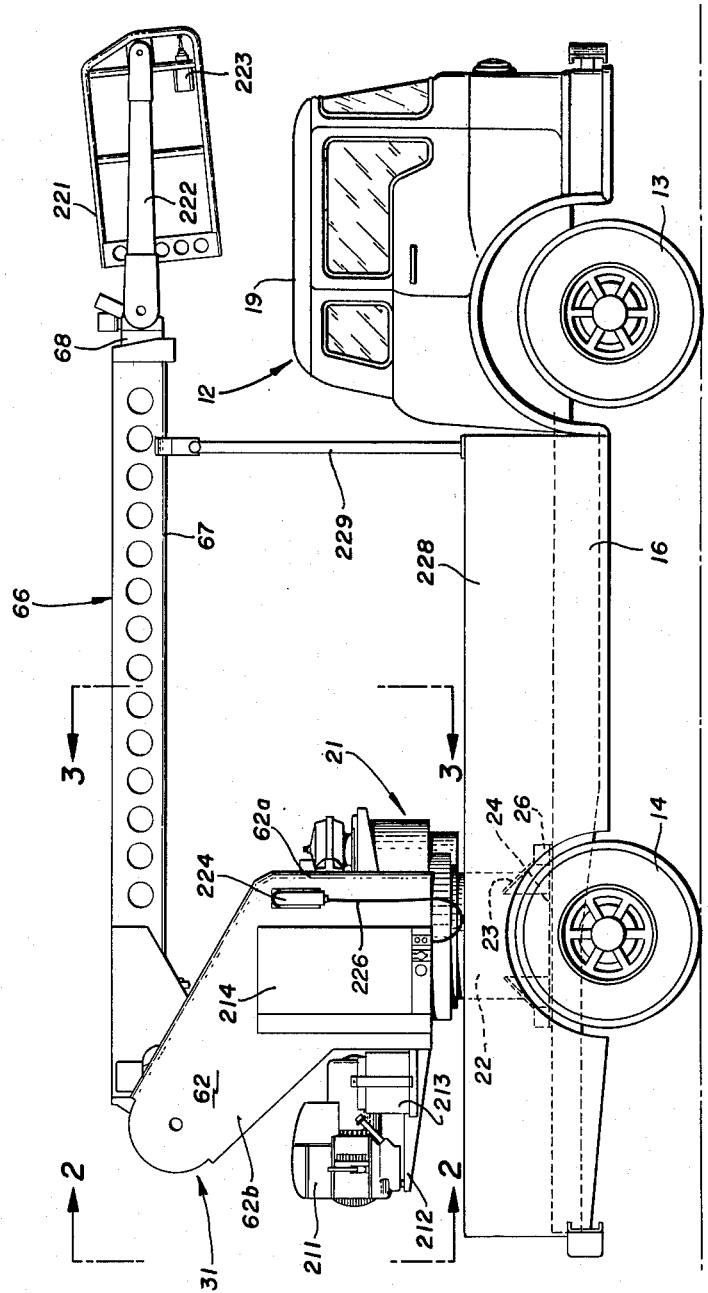
FIGURE 1 is a side elevational view of a mobile lifting equipment incorporating the present invention.
Figure 5:
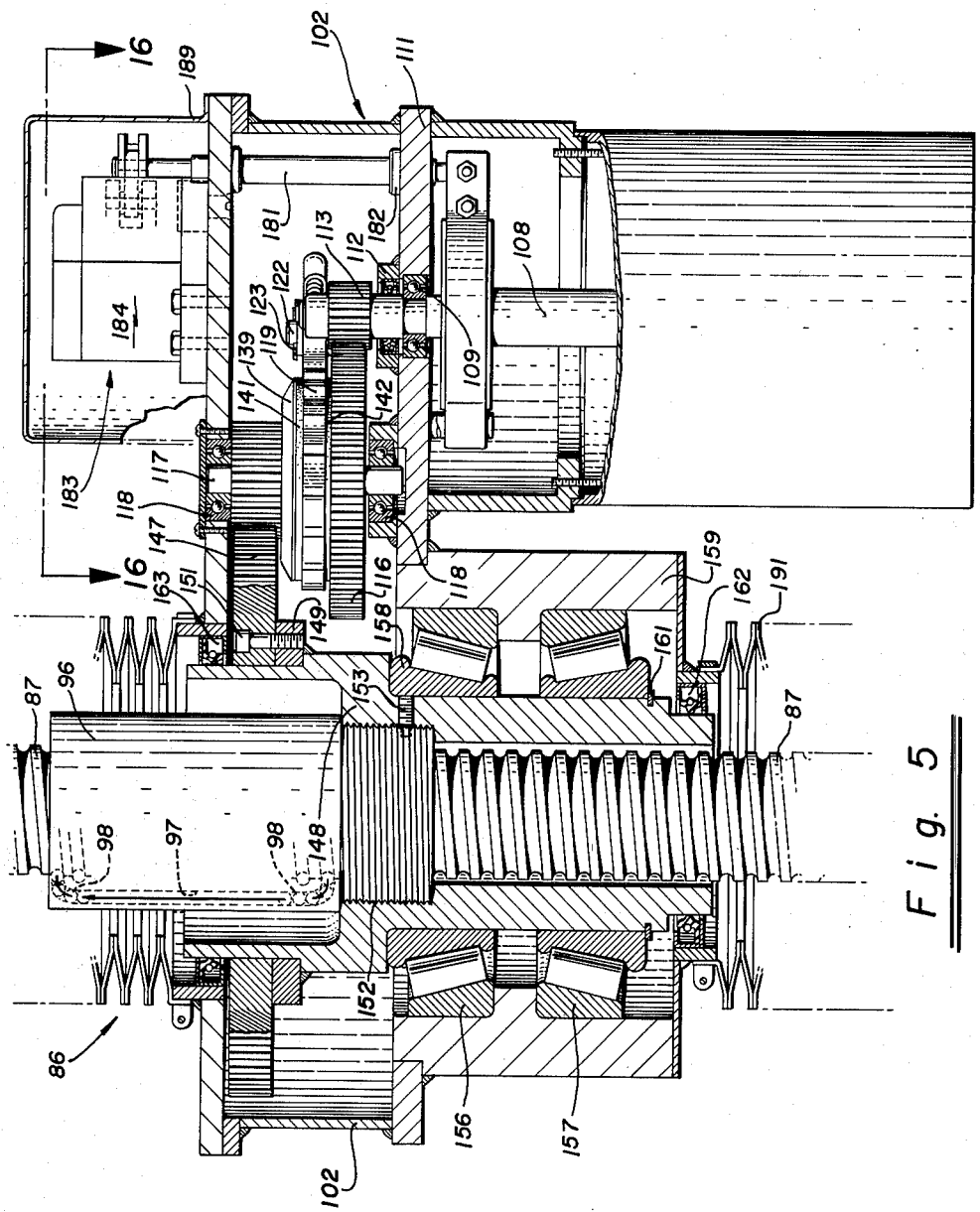
FIGURE 5 is a still further enlargement of the nut driving gear assembly and is shown partially in cross-section.

In general, my mobile lifting equipment is of a type which includes a wheeled vehicle having a frame. A lifting supporting structure is mounted on the frame and means is provided for rotating the lift supporting structure about a vertical axis. The mobile lifting equipment also includes a boom structure. Means is provided for pivotally mounting one end of the boom structure on the lift supporting structure at a point offset a substantial distance from the vertical axis of the lift supporting structure. Screw jack means is attached to the boom structure and is provided for raising and lowering the boom structure about a horizontal axis. Particularly novel means is provided for driving the screw jack means. In addition, means is provided for rendering the screw jack means inoperative when the boom structure comes into engagement with an object during lowering of the boom structure.

The mobile lifting equipment illustrated in the drawings consists generally of a wheeled vehicle 12 which is provided with front and rear wheels 13 and 14. The vehicle 12 also includes a pair of laterally spaced longitudinal frame members 16 which are supported by cushioning assemblies mounted on the rear axle (not shown) connecting the rear wheels 14. A cab 19 is mounted on the front end of the vehicle and encloses the motor (not shown) for driving the vehicle.

A lifting equipment 21 is mounted on the framework 16 of the vehicle. It consists of a cylindrical riser or tub 22 which is affixed to both of the laterally spaced longitudinally extending frame members 16 by suitable means such as bolts (not shown) to provide at least a four-point attachment for the riser 22. Reinforcing gussets 23 are provided for firmly securing the cylindrical riser 22 to the frame member 16. It will be noted that the cylindrical riser 22 is mounted in such a manner that it generally overlies the axle of the rear wheels. Torsion bar assemblies of the type described in my Patent No. 2,841,404 are rotatably mounted in bearing blocks 26 secured to the frame member 16 adjacent the cylindrical riser 22 and serve to stabilize the lifting equipment when the lifting equipment is moved sideways of the vehicle.

A lift supporting structure 31 is rotatably mounted upon the cylindrical riser 22 for rotation about a vertical axis.

For this purpose, a base ball bearing assembly 32 is mounted upon the cylindrical riser 22. The outer race 33 of the ball bearing assembly 32 is secured to a ring 34 by suitable means such as cap screws 36. The ring 34 is affixed to the upper end of the cylindrical riser 22 by suitable means such as welding.

The lift supporting structure 31 includes a turret cab 37 which has a base structure 38. The base structure 38 includes a cylindrical section 39 which is affixed to a ring 41 by suitable means such as welding. The ring 41 is secured to the inner race of the ball bearing assembly 32 by suitable means such as cap screws 43.

Means is provided for rotating the lift supporting structure relative to the cylindrical riser 22 and consists of a reversible electric motor 46 mounted within the turret cab 37 which drives a double worm gear reduction unit 47. The output shaft 48 of the gear reduction unit 47 depends downwardly from the cab 37 and is connected to a flexible coupling 49. The flexible coupling is connected to another vertical shaft 51 upon which is mounted a drive pinion 52. The shaft 51 is rotatably carried in a pair of ball bearing assemblies 53. The bearing assemblies are mounted in a pinion housing 54 affixed to a bracket 56 secured to the cylindrical member 39 of the cab 37. A protective housing or cover 57 encloses the rotating shafts 48 and 51 as well as the flexible coupling 49. The flexible coupling 49 provides shock cushioning for the gear box 47. The pinion 52 engages teeth on a ring gear 59 provided as an integral part of the outer race 33. It is readily apparent that upon operation of the reversible motor 46, the turret cab 37 will be rotated about a vertical axis substantially coincident with the vertical axis of the cylindrical riser 22.

The base structure 38 of the turret cab 37 also includes a horizontal base plate 60, having an opening 61 provided for a purpose hereinafter described. The turret cab 37 also includes a pair of side plates 62 which have a lower portion 62a which rises vertically and an upper portion 62b which is inclined away from the vertical axis of the base structure 38 to provide a cantilevered structure. The outer edges of the side plates 62 are inclined inwardly as shown in the drawings to give a streamlined appearance to the turret cab.

The lifting equipment 21 also includes a boom structure 66 which is similar to the boom structure described in my Patent No. 2,896,750. The boom structure consists of an outer or main section 67 and an inner or telescopic section 68. Means is provided for rotatably mounting one end of the boom structure 66 for movement about a horizontal axis in the lift supporting structure. This means consists of a cylindrical inner bearing member 71 in the form of a pipe 71 which extends between the outer ends of the side plates 62. An outer sleeve bearing 72 rotates about the inner sleeve bearing member. A pair of semi-circular clamping members or saddles 73 and 74 are adapted to be secured to the outer sleeve bearing 72 by suitable means such as bolts 76. A pair of plates 77 mounted in the sides of the outer boom section 67 serve to fix the clamping member 74 to the outer section of the boom structure 66.

Means is provided for extending and retracting the inner section 68 relative to the outer section 67 of the boom structure and consists of a motor 81 which drives a gear reduction unit 82. The gear reduction unit 82 is utilized for driving a chain (not shown) similar to that described in my Patent No. 2,896,750 for extending and retracting the inner section with respect to the outer section.

Means is provided for raising and lowering the outer end of the boom structure relative to the horizontal axis formed by the pipe 71. This means consists of a ball screw jack assembly 86. The ball screw jack assembly includes a screw 87, one end of which is provided with an eye 88 that is pivotally connected by a pin 89 to a pair of rocker arms 91. The ends of the rocker arms 91 are resiliently mounted in bracket assemblies 92. Each of the bracket assemblies consists of a U-shaped member 93 which carries L-shaped pieces 94 of suitable resilient material such as "Fabreeka" manufactured by the Fabreeka Products Co. of Boston, Massachusetts. These L-shaped pieces of material enclose one side and the lower surface of the rocker arms 91 as shown particularly in FIGURE 11. Additional pieces 95 of similar resilient material are mounted between the rocker arms and the outer section 67 of the boom structure 66. The bracket assemblies are secured to the rocker arms and to the outer section 67 by suitable means such as bolts 90 which extend through the U-shaped member 93, the "Fabreeka" pieces 94 and 95, and the ends of the rocker arm 91. In this way, it can be seen that there is a resilient connection between the end of the screw 87 and the outer section 67 of the boom structure to thereby in effect provide a shock mounting for the boom structure.

The ball screw jack assembly 86 also includes a nut 96 and is of a type which is of substantially conventional construction. For example, it may be of a type manufactured by the Saginaw Steering Gear Division of General Motors, Saginaw, Michigan. Provided within the nut are a plurality of recirculating tubes 97 which carry ball bearings 98. In this embodiment shown, the screw is stationary and the nut is driven; however, it is readily apparent to those skilled in the art that, if desired, the nut could be made stationary and the screw rotated.

In the present embodiment, means is provided for rotating the nut and consists of a motor 101 which is affixed to the nut drive gear box 102. A pair of trunnions 103 are provided on opposite sides of the gear box 102 and are rotatably mounted in pillow blocks 104 mounted on U-shaped brackets 106 affixed to the side walls 62 of the turret cab and extending inwardly therefrom. It will be noted that the screw 87 extends through the nut drive gear box and into the opening 61 in the base plate 60. The brackets 106 are formed so that a space is provided between them for receiving the screw 87.

The motor 101 has an output shaft 108 which has its upper end rotatably mounted in a ball bearing assembly 109 mounted in a plate 111 which forms a part of the nut drive gear box 102. An oil seal 112 is provided on the shaft 108 to prevent leakage from the nut drive gear box 102. The shaft 108 drives a pinion 113. The pinion 113 drives an intermediate gear 116 affixed to an intermediate shaft 117 rotatably mounted in the nut drive gear box 102 by a pair of ball bearing assemblies 118. A ratchet 119 is mounted on the intermediate shaft 117 as hereinafter described and is adapted to be engaged by a ratchet pawl 121 which is pivotally mounted on a pin 122 mounted within the nut drive gear box 102. The ratchet pawl is retained on the pin 122 by suitable means such as a cotter pin 123. One end of the ratchet pawl is adapted to engage the teeth provided on the ratchet 119 as shown particularly in FIGURE 8, whereas the other end of the ratchet pawl is provided with a return spring 124 which has one end seated in a well 126 in the ratch pawl and has the other end engaging a spring retainer 128 also mounted within the nut drive gear box 102. A pawl drag spring 129 is mounted on the ratchet pawl 121 and extends downwardly from the ratchet pawl as shown particularly in FIGURE 6 and engages the substantially flat upper surface of the intermediate gear 116. The drag spring 129 is seated within a well 131 provided in the ratchet pawl 121.

Intermediate gear 116 and the ratchet 119 form a part of a safety brake assembly 132 as hereinafter described. The brake assembly 132 consists of a brake disc hub 133 which is affixed to the intermediate shaft 117 by suitable means such as a key 134. The lower extremity of the hub, as can be seen from FIGURE 6, is adapted to engage a stop washer splined on the shaft 117. The washer 136 normally rests on the bottom wall 111. The washer 136 is formed with a pair of ears 136a which are adapted to engage a diametrically extending rib 116a provided on the gear 116 as shown in FIGURE 9. The brake disc hub 133 is provided with a modified Acme thread 137 upon which the intermediate gear 116 is threaded, as shown particularly in FIGURE 6. The brake disc hub 133 is also provided with an outwardly extending flange 139 to which an annular brake disc 141 is affixed. This brake disc 141 is adapted to engage the upper surface of the ratchet 119 for a purpose hereinafter described. A brake disc 142 is also mounted on the upper surface of the intermediate gear 116 and is adapted to engage the lower surface of the ratchet 119 also for a purpose hereinafter described.

The ratchet 119 is mounted on the brake disc hub 133 in such a manner that when the brake discs 141 and 142 are out of engagement with the ratchet, the shaft 117 can be rotated.

It is readily apparent that, if desired, the brake discs instead of being affixed to the brake disc hub 133 and the intermediate gear 116, can be affixed to the upper and lower surfaces of the ratchet 119 and still perform the same function.

An intermediate pinion 146 is affixed to the shaft 117 and drives a final drive gear 147. The final drive gear 147 is affixed to a nut carrier 148 by a ring 149. The ring 149 is affixed to the nut carrier 148 by suitable means such as welding and to the final drive gear 147 by suitable means such as cap screws 151. The nut carrier 148 is affixed to the nut 96 in a suitable manner such as by the threaded connection 152 shown. A set screw 153 is provided for locking the nut carrier 148 and the nut 96 into a unitary assembly.

The nut carrier 148 is supported within the nut drive gear box 102 by a pair of thrust bearings 156 and 157 with thrust bearing 156 being positioned to take the downward loading and the thrust bearing 157 being positioned to take the upward loading during operation of the lifting device as hereinafter described. The inner race of the thrust bearing 156 engages a shoulder 158 provided on the nut carrier, whereas the outer race engages an inwardly extending annular projection 159 on the nut drive gear box 102. The outer race of the thrust bearing 157 engages the lower surface of the annular extension 159, whereas the inner race engages a retaining ring 161 secured to the nut carrier.

The gear train hereinbefore described together with the nut 96 and the nut carrier 148, the thrust bearings 156 and 157, and the other parts forming a part of the drive for the nut are all enclosed within the nut drive gear box 102 which is preferably oil filled. Suitable oil seals such as the oil seal 112 are provided for making the nut drive gear box oil-tight. Thus, additional seals 162 and 163 are provided in the nut drive gear box for forming a seal between the nut carrier 148 and the nut drive gear box 102.

A holding brake 165 is mounted on the drive shaft 108 and consists of a brake drum 164 which is affixed to the shaft 108 by suitable means such as a key 166. The brake 153 also consists of a pair of brake shoes 167 which are pivotally mounted on pins 168 mounted in the nut drive gear box 102. The brake shoes 167 are provided with brake linings 169 which are adapted to engage the brake drum 164. Means is provided for yieldably urging the brake shoes in a direction so that the brake lining 169 is urged into engagement with the brake drum 164. Such means consists of a rod 171 with threaded ends which extend through the brake shoes at a point remote from the pivotal connections for the brake shoes. A pair of brake springs 172 are mounted on opposite ends of the rod 171 and are held in engagement with the brake shoes by nuts 173 threaded on the rod 171.

Means is provided for urging the brake shoes 167, and the brake linings 169 carried thereby out of engagement with the brake drum and consists of a pair of inwardly facing screws 176 threaded into the ends of the brake shoes remote from the pivoted ends of the brake shoes. The screws 176 are locked in position by nuts 177. The screws 176 are provided with heads 178 which are spaced apart and are adapted to be engaged by a spreading element 179 affixed to a control rod 181. The control rod 181 is rotatably mounted in bushings 182 provided in the side walls of the nut drive gear housing 102. The control rod 181 is adapted to be rotated between two positions by a solenoid assembly 183 which consists of a solenoid 184 having a plunger 186. The solenoid 184 is affixed to the nut drive gear housing 102 as shown particularly in FIGURE 16. The plunger 186 is pivotally connected to one end of a link 187. The other end of the link 187 is connected to a lever arm 188 which is affixed to the control lever 181 as shown in FIGURE 6. The lever arm 188 is normally maintained in a position shown in full lines in FIGURE 16 when the solenoid is de-energized. When the solenoid is energized, the lever arm is moved to the position shown in dotted line in FIGURE 16. The solenoid assembly 183 is enclosed in a cover 189 affixed to the nut drive gear housing 102.

This generally completes the description of the drive means for raising and lowering the boom structure 66. However, it should be pointed out that, if desired, and as shown in the drawings, the upper and lower extremities of the screw 87 may be enclosed in bellows 191 which have one end affixed to the nut drive gear box 102 and the other end affixed to the extremity of the screw by suitable means such as clamps 193.

Means is provided for rendering the means for raising the boom structure inoperative when the boom structure has been raised to a predetermined angle. Such means consists of a Microswitch 196 which is mounted on one of the side plates 62 of the turret cab and which has an operating lever 197 which is adapted to be engaged by a switch operating member 198 affixed to the saddle or clamping members 73 and 74. As can be seen particularly from FIGURE 10, when the boom structure reaches a predetermined elevation, such as the elevation shown in FIGURE 10, the switch 196 is operated to de-energize the motor 101 used for raising and lowering the boom structure 66.

Means is also provided for preventing additional lowering of the boom structure when the boom structure comes into engagement with an object and is particularly shown in FIGURES 10, 11 and 12. To this end, a resilient mounting has been provided which when deformed beyond a predetermined amount will cause actuation of a Microswitch 201 to cause de-energization of the drive motor 101 used for driving the nut 96 of the ball screw jack assembly 86. This resilient mounting means can be placed in any desired location just so long as it is deformed when the boom comes into engagement with an object during lowering of the boom structure. In the embodiment shown in the drawings, resilient mounting means has been provided for the pillow blocks 104 which carry the trunnions 103 of the nut drive gear box 102. The switch 201 is carried by a bracket 202 affixed to the brackets 106 carrying the pillow blocks 104. Each of the pillow blocks is mounted on a piece 203 of suitable resilient material such as "Fabreeka" manufactured by the Fabreeka Products Co. of Boston, Mass. An additional piece 204 of similar resilient material is mounted on top each side of the pillow blocks. The pieces of resilient material and the pillow blocks are secured to the brackets 106 by suitable means such as bolts 206. The piece 203 extends across the entire bottom surface of the pillow block and, therefore, has a substantially greater area than the pieces 204. For this reason to obtain the same amount of deflection for the same amount of force piece 203 must have a greater thickness than the pieces 204.

The upper surface of one of the pillow blocks 104 is provided with a cam surface 207 which is adapted to be engaged by an operating arm 208 of the switch 201. The position of the switch 201 relative to the cam surface is normally adjusted so that the switch is closed during normal loading on the boom structure. When the boom structure moves into engagement with an object during lowering of the same, this normal loading will be removed to allow expansion of the piece 203 to thereby open the switch and de-energize the motor 101 for lowering the boom structure.

Suitable means is provided for controlling the supply of power to the motors 46, 81 and 101 utilized for rotating the lift supporting structure, for extending and retracting the boom structure, and for raising and lowering the boom structure. Such means consists of a gasoline driven motor generator set 211 of suitable type such as that manufactured by Onan. This motor generator set 211 is mounted on an extension 212 secured to the rear of the base structure 48 for the turret cab 37. As shown in FIGURE 2, outside dimensions of the motor generator set are within the outer dimensions of the sides of the turret cab 37. It also will be noted that the motor generator set generally underlies the cantilevered sides of the turret cab and also generally underlies the pivotal mounting for the boom structure 66.

A battery 213 is mounted within the turret cab 37 and is provided for starting the gasoline motor of the motor generator set 211. A control panel 214 is mounted on the outside of one of the side plates of the turret cab 37 and contains the conventional control relays and the like required for operating the motors 46, 81 and 101. A gasoline tank 216 is mounted on the outside of the other side plate 62 and serves as gasoline supply for the motor generator set 211.

A workman's basket 221 is pivotally mounted between a pair of arms 222 affixed to the end of the inner boom 68. The workman's basket is provided with a control switch 223 such as disclosed in my Patents Nos. 2,627,560 and 2,841,659. As disclosed in these patents, the control switch is provided with contacts for energizing the motors 46, 81 and 101 in forward and reverse directions so that the lift supporting structure can be rotated in clockwise and counter-clockwise directions about a vertical axis so that the boom structure extended and retracted, and so that the boom structure can be raised and lowered about a horizontal axis. An additional ground control box 224 provided with push buttons (not shown) for accomplishing the same control functions as can be accomplished by the switch 223 is detachably mounted on one side wall 62 of the turret cab 37. The control switch 223 and the control box 224 may be constructed in a manner disclosed in my Patent No. 2,936,847. The control 224 is connected to the control panel 214 by a flexible cable 226.

A flat horizontal work platform 228 is mounted on the frame members 16 of the vehicle and extends from the rear of the cab 19 along the entire length of the bed of the vehicle. A stand 229 is provided on the front end of the platform 228 for supporting the boom structure 66 when it is not in use.

Operation and use of my mobile lifting equipment may now be briefly described as follows. Let it be assumed that it is desired to utilize the mobile lifting equipment. With the equipment in the position shown in FIGURE 1, the lifting equipment is operated by the control box 224 to bring the boom structure and the workman's basket 221 carried by the boom structure into a position so that the workman's basket can be lowered and the workman can step into the workman's basket. Thereafter, the workman in the workman's basket can control the positioning of the boom structure by operation of the switch 223. Thus, by operating either the switch 223 or the control box 224, the motor 46 can be energized in either forward or reverse directions to cause rotation of the lift supporting structure including the turret cab in a counter-clockwise or clockwise direction about a vertical axis merely by causing rotation of the pinion 52 which engages teeth on gear 59 on the outer race of the base ball bearing assembly 32. Thus, because the outer is secured to the cylindrical riser 22, the lift supporting structure is rotated about a vertical axis which is coincident with the axis of the base ball bearing assembly 32. Rotation of the lift supporting structure causes rotation of the inner race 42 of the base ball bearing assembly and all the structure attached thereto. Rotation of the lift supporting structure also causes rotation of the boom structure carried thereby as well as the motor generator set 211 carried by the lift supporting structure.

By operating the switch 223 or control box 224 to energize the motor 81 in rotation in either a forward or reverse direction the boom structure can be extended or retracted in a manner similar to that described in my Patent No. 2,896,750.

By operating of the control switch 223 or the control box 224 the motor is energized to rotate in either a forward or reverse direction to raise or lower the boom structure. For example, let it be assumed that it is desired to raise the boom structure 66. When such is the case, the motor 101 is operated in a forward direction and causes rotation of the shaft 108 in a clockwise direction as viewed in FIGURE 8 to cause counter-clockwise rotation of intermediate gear 116.

At the time the motor 101 is energized, the solenoid 184 is energized to cause rotation of the control rod 181 to spring apart the brake shoes 167 to thereby release the brake drum 164. This release of the holding brake 165 permits rotation of the shaft 108. The counter-clockwise rotation of the intermediate gear 116 causes it to be threaded upwardly as viewed in FIGURE 6 on the threads 137 provided on the brake disc hub 133 so that the brake disc 142 is moved into engagement with the ratchet 119. This causes the ratchet to be moved upwardly into engagement with the brake disc 141 provided on the flange 134 of the brake disc hub 133 to thereby lock the same into a unitary assembly and to thereby cause rotation of the intermediate shaft 117.

Rotation of the intermediate gear 116 in a counter-clockwise direction as viewed in FIGURE 8 engages the drag spring 129 which urges the ratchet pawl 121 out of engagement with the teeth provided on the ratchet 119 against the force of the yieldable spring 124. Thus, during the time that the intermediate gear 116 is being rotated in a counter-clockwise direction, the ratchet pawl 121 is maintained out of engagement with the ratchet 119.

Rotation of the intermediate shaft 117 by the safety brake assembly which has been locked together in a unitary assembly causes rotation of the pinion 146 in a counter-clockwise direction as viewed in FIGURE 8. The pinion 146 causes clockwise rotation of the final drive gear 147. Clockwise rotation of the final drive gear 147 causes clockwise rotation of the nut 96 which causes raising of the screw 87. Raising of the screw 87 causes the boom structure to be raised about the horizontal axis formed by the pivotal mounting provided for mounting the end of the boom structure 66 in the turret cab 37. This action can continue until the screw has been moved into the extreme upward position shown in dot and dash lines in FIGURE 10. The uppermost limit is controlled by the limit switch 196 which is engaged by the switch operating member 198 carried by the boom structure and serves to de-energize the motor 101 to prevent further rotation and raising of the screw 87.

When the motor 101 is de-energized, the holding brake 165 is again engaged because the solenoid 184 is de-energized at this time. The screw 87 cannot run down in the nut 96 because the boom will be held in the predetermined position as hereinafter described. The weight of the boom structure upon the screw has a tendency to cause rotation of the nut in a counter-clockwise direction. This tends to cause clockwise rotation of the pinion 146 and the shaft 117 to which it is affixed. This also tends to cause clockwise rotation of the brake disc 113 to cause it to be threaded downwardly into the intermediate gear 116 to thereby firmly urge the brake discs 141 and 142 into engagement with the ratchet 119. In addition, this tendency to cause rotation of the brake disc hub 133 in a clockwise direction also has a tendency to cause rotation of the intermediate gear 116 in a clockwise direction because of the lockup between the various parts of the safety brake. The intermediate gear, in turn, tends to cause counter-clockwise rotation of the pinion 113 which is prevented by the brake 165. Thus, it can be seen that the holding brake 165 and the safety brake assembly 132 work against each other to lock the boom structure in a predetermined position.

Additional safety latching means is provided in the form of the ratchet 119 and the pawl 121. As soon as the intermediate gear 116 stops rotating, the pawl 121 is urged into engagement with the teeth on the ratchet 119 by he spring 124 to prevent the ratchet 119 from rotating. Thus, in addition to the holding brake 165, there is provided the ratchet 119 and the pawl 121 to prevent the boom structure from dropping after it has been raised to a predetermined elevated position.

Now let it be assumed that it is desired to lower the boom structure 66. When such is the case, the motor 101 is energized so that it operates in a reverse direction. At the same time, the solenoid 184 is de-energized to release the brake 165. As soon as the brake 165 is released, and the motor 101 starts operating, the intermediate gear 116 is rotated in a clockwise direction to unscrew it on the Acme threads to thereby loosen the safety brake assembly 132. This loosening is facilitated by the weight of the boom structure which presses downwardly on the screw 87 and which, in turn, causes counter-clockwise rotation of the final drive gear 147. This causes clockwise rotation of the pinion 146 and the shaft 117 connected thereto. This counter-clockwise rotation of the shaft 117 causes counter-clockwise rotation of the stop washer 136 as viewed in FIGURE 9. After a slight initial movement, the ears 136a of the stop washer engage the diametrical rib of the gear 116 to help unscrew the intermediate gear 116 from the shaft 117 to thereby release the safety brake assembly 132.

However, if during the lowering of the boom structure the weight of the boom structure on the screw tends to cause the brake disc hub 133 to overrun the rate of travel of the intermediate gear 116, the brake assembly 132 will again be operated or tightened to arrest the downward movement of the boom structure until the intermediate gear 116 is again lowered by the rotation of the shaft 108 by the motor 101. Thus, it can be seen that the lowering of the boom structure 66 is always under the control of the motor 101 so that the lowering is at a controlled rate determined by the speed of rotation of the motor 101. It has been found that this lowering action is very smooth even though on occasion the boom structure causes the brake disc hub 133 to overrun the travel of the intermediate gear 116. As soon as the boom structure has been lowered to the desired position, the motor 101 is de-energized by operation of the control switch 223 or the control box 224. At the same time, the solenoid 184 is de-energized to cause engagement of the holding brake 165. The weight of the boom upon the screw 87 causes the brake disc hub 133 to be threaded downwardly into the intermediate gear 116 to lockup the safety brake assembly 132 in a manner similar to that hereinbefore described. Thus, again the boom structure is maintained in a predetermined elevated position after the motor 101 has been de-energized.

During the time that the boom structure 66 is carrying normal loads, the resilient members 203 will be deformed in accordance with the weight carried by the boom structure. As explained previously, switch 201 is adjusted so that during this normal loading, the switch is in a closed position. Now let it be assumed that upon lowering the boom structure, the structure comes into engagement with an object. As soon as this occurs, the load which is carried by the screw 87 will be relieved to thereby also relieve the load on the pillow blocks 104. This reduces the loading on the resilient members 203 to permit their expansion and raising of the pillow blocks. This raising of the pillow blocks causes a raising of the operating arm 208 of the switch 201 to open the circuit to the motor 101 to de-energize the motor.

If such safety means were not provided, the boom structure would continue to be lowered and eventually after coming in contact with the ground or other object could cause a continued lifting of one side of the truck until the truck could possibly be tipped over. Also, if by chance the boom structure is lowered over the cab without such safety means, the boom structure could be lowered into the cab and actually crush the cab. This is because the intermediate gear 116 is driven into engagement with the stop washer 136 by the motor 101 and is continued to be driven as long as the motor 101 is energized.

Although the resilient means has been placed under the pillow blocks, it is apparent that, if desired, such resilient means could be provided in many other places in the cab turret to accomplish the same purpose. For example, it could be mounted in the brackets 106 or under the turret cab.

The construction hereinbefore described has many advantages. The turret cab 37 is constructed in such a manner that easy access may be had to all the working parts of the lifting equipment. In addition, the motor generator set is located in such a position that all of its parts are readily accessible for repair and maintenance.

Another embodiment of my invention is shown in FIGURES 13, 14 and 15, and consists of a different type base rather than the rectangular four point mounting provided in the embodiment shown in FIGURE 1. It has been found that the mounting for the cylindrical riser 22 provided in FIGURE 1 actually provides a very rigid construction which may not always be desirable particularly if a soft ride is desired for the workman in the workman's basket 223. In addition, such a rigid connection may unduly stress the frame of the vehicle when travelling over rough terrain. It is for this reason that a three-point mounting is provided for the lifting equipment in this latter embodiment rather than the rigid four-point mounting provided in FIGURE 1.

A pair of cross members 231 and 232 are secured to the frame members 16. Three mounting assemblies 233 are mounted on the cross members 231 and 232 and are secured to the three corners of a triangular base plate 234 as shown particularly in FIGURE 13. The cylindrical riser 22 is mounted on the triangular base plate 24 in the manner shown. The mounting assemblies 233 are positioned in such a manner that two of the mounting assemblies 233 are placed on opposite ends of the cross member 231 overlying the frame members 16 and the other mounting assembly 233 is mounted on the cross member 232 intermediate the ends of the same.

Each of the mounting assemblies 233 consists of a pair of channel members 236 which are affixed to one of the cross members 231 or 232 by suitable means such as welding. A support plate 237 is secured to the top surfaces of the channel members 236 by suitable means such as cap screws 238. A cylindrical member 239 of a suitable resilient material such as "Fabreeka" is mounted upon the plate 237 and engages the bottom surface of the triangular plate 234. The support plate 237 is secured to the triangular plate 234 by a bolt 241. The bolt 241 is mounted in a cylindrical member 242 of a resilient material such as rubber. The resilient material 242 is enclosed within a rigid cylindrical member 243 which is mounted in the plate 237. The head of the bolt 241 engages a plate 246. The plate 246 engages a cylindrical member 247 of suitable resilient material such as "Fabreeka" and holds it against the bottom surface of the plate 237.

From the construction hereinbefore described, it is apparent that the mounting 233 is of a resilient type. The members 242 and 243 have a length which is substantially less than the spacing between the plates 246 and the triangular plate 234 to permit a predetermined amount of compression of the resilient members 239 and 247. The spacing is sufficient so that the resilient members 239 and 247 can absorb the normal shock loads which are encountered by the vehicle. However, the rigid member 243 prevents deformation beyond a predetermined amount because at that point, the triangular plate 234 comes into engagement with the cylindrical member 243 to prevent additional deformation of the member 239. Thus, when the boom is heavily loaded only a certain amount of deformation can occur after which the base plate 234 comes into engagement with the rigid member 243 to prevent undue tilting of the lift supporting structure. In the same manner, the spacing between the member 243 and the plate 246 limits deformation in the opposite direction.

The resilient mountings 233, therefore, serve to insulate the lifting equipment from road shocks and truck vibration during the time that the vehicle is travelling. This serves to reduce wear on the lifting equipment and in particular serves to reduce brinelling in the bearings. This is particularly important because the base ball bearing assembly 32 and the ball screw jack assembly 86 are relatively large and, therefore, are quite expensive.

The base ball bearing assembly 32 can be of any suitable type such as the "mono-Race" ball bearing assembly manufactured by the Thew Shovel Co. of Lorain, Ohio.

The resilient mountings 233 serve to eliminate or greatly reduce brinelling of the bearing races of the base ball bearing assembly 32 and the ball screw jack assembly 86 during the time the vehicle is travelling. In addition, the resilient mountings serve to reduce the stresses placed on the frame of the vehicle. The three-point mounting provided for the lift supporting structure on the frame also serves to reduce the stresses placed upon the frame of the vehicle.

It is apparent from the foregoing that I have provided a mobile lifting equipment which has many unique advantages. In particular, the means for raising and lowering the boom structure makes it possible to pivotally mount the boom structure about a horizontal axis which is at the end of the boom structure. This makes it possible to utilize the boom structure in a manner in which it can reach to greater heights than in the type of construction such as that disclosed in my Patent 2,896,750 wherein the pivotal mounting for the boom structure is provided intermediate the ends of the boom structure. At the same time, the means for rotating the boom structure, extending retracting the boom structure, and raising and lowering the boom structure are relatively simple. The overall construction of the lifting equipment is such that all of its parts are readily accessible for maintenance and repair. The lifting equipment may be operated in all positions with safety. To this end, a double safety means has been provided to ensure that the boom will not at any time accidentally fall to the ground and thereby endanger the life of the workman in the workman's basket.

I claim:

1. In a mobile lifting equipment of the type including a wheeled vehicle having a frame, a lift supporting structure mounted on the frame, means for rotating the lift supporting structure about a vertical axis, a boom structure, means for pivotally mounting one end of the boom structure on the lift supporting structure, substantially rigid extensible means pivotally connected to the lift supporting structure and pivotally connected to the boom structure at a point spaced from the point at which the boom structure is pivotally connected to the lift supporting structure, means for causing operation of said extensible means to cause raising and lowering of the boom structure about the horizontal axis and means mounted in the lift supporting structure adjacent the extensible means for rendering the means for operating the extensible means inoperative when the boom structure comes into engagement with an object during lowering of the same to prevent tipping over the mobile lifting equipment.

2. In a mobile lifting equipment of the type including a wheeled vehicle having a frame, a lift supporting structure mounted on the frame, means for rotating the lift supporting structure about a vertical axis, a boom structure, means for pivotally mounting one end of the boom structure on the lift supporting structure at a point offset a substantial distance from the vertical axis of the lift supporting structure, a screw having one end pivotally connected to the boom at a point spaced from the point at which the boom structure is pivotally connected to the lift supporting strucure, a nut threaded on said screw, means mounted on said lift supporting structure for carrying said nut, means for rotating said nut to cause raising and lowering of the screw and to thereby cause raising and lowering of said boom structure about the horizontal axis said last named means including a rotatable shaft, gearing connecting the rotatable shaft to the nut, motive means driving the rotating shaft, safety brake means mounted on the rotating shaft, and means operative to cause the safety brake means to be normally in engagement during raising of the boom structure and normally out of engagement during lowering of the boom structure.

3. In a mobile lifting equipment of the type including a wheeled vehicle having a frame, a ball bearing assembly having an inner and outer race, one of the races being affixed to the frame, a lift supporting structure affixed to the other race, a gear affixed to said first named race, a pinion engaging the gear, motive means mounted on the lift supporting structure for driving the pinion to cause rotation of the lift supporting structure about a vertical axis, a boom structure, means for pivotally mounting one end of the boom structure on the lift supporting structure at a point offset a substantial distance from the vertical axis of the lift supporting structure, a screw having one end pivotally connected to the boom at a point spaced from the point at which the boom structure is pivotally connected to the lift supporting structure, a nut threaded on said screw, motive means mounted on said lift supporting structure, and gearing means connecting said motive means to said nut for causing rotation of said nut to thereby cause raising and lowering of the boom structure about the horizontal axis said gearing means including a rotatable shaft, a safety brake mounted on said shaft and rotatable therewith and means for rendering said safety brake normally in engagement and rotating with said shaft during raising of the boom structure and out of engagement during lowering of the boom structure.

4. A mobile lifting equipment as in claim 3 together with a holding brake engaging a portion of the gearing assembly to maintain the boom structure at a predetermined elevation and means effective upon operation of the motive means to disengage the holding brake.

5. A mobile lifting equipment as in claim 3 together with a ratchet mounted on said shaft adjacent said safety brake, a pawl, means yieldably urging the pawl into engagement with the ratchet to arrest movement of the ratchet, and means for causing the pawl to the moved out of engagement with the ratchet and for causing the safety brake to engage the ratchet so that the ratchet rotates with the safety brake during raising of the boom structure.

6. In a mobile lifting equipment of the type including a wheeled vehicle having a frame, a lift supporting structure mounted on the frame, means for rotating the lift supporting structure about a vertical axis, a boom structure, means for pivotally mounting one end of the boom structure on the lift supporting structure for movement about a horizontal axis, a screw having one end pivotally connected to the boom at a point spaced from the point at which the boom structure is pivotally connected to the lift supporting structure, a nut threaded on said screw, motive means, a gearing assembly connecting said motive means to said nut to cause rotation of the nut for raising and lowering of the screw to thereby cause raising and lowering of the boom structure about the horizontal axis, the gearing assembly including first and second shafts, means connecting the first shaft to the motive means, a holding brake mounted on said first shaft and being normally in an engaging position, means for moving said holding brake to a disengaged position upon operation of the motive means, a hub affixed to said second shaft, said hub being provided with external threads, a gear threaded on said hub, the hub having a flange, a ratchet mounted on said hub between the flange and the gear, braking elements disposed between the ratchet and the gear and between the ratchet and the flange, means for driving said gear from said first shaft, a pawl adapted to engage said ratchet, and means connecting said second shaft to said nut whereby as said second shaft is rotated said nut is rotated, said gear being threaded and unthreaded from said hub to urge the safety brake between engaging and disengaging positions, and means operated by the second shaft for moving the pawl out of engagement with the ratchet during rotation of said second shaft in one direction and into engagement with the ratchet during rotation of the second shaft in an opposite direction.

7. In a mobile lifting equipment of the type including a wheeled vehicle having a frame, a lift supporting structure mounted on the frame, means for rotating the lift supporting structure about a vertical axis, a boom structure, means for pivotally mounting one end of the boom structure on the lift supporting structure for movement about a horizontal axis, a screw having one end pivotally connected to the boom at a point spaced from the point at which the boom structure is pivotally connected to the lift supporting structure, a nut threaded on said screw, means mounted on said lift supporting structure for carrying said nut, and means for rotating said nut to cause raising and lowering of the screw to thereby cause raising and lowering of the boom structure about its horizontal axis and for holding said nut stationary after raising or lowering of the boom to a predetermined position, said means for rotating said nut and for holding said nut stationary after movement of said boom to a predetermined position including a safety brake normally in engagement during raising of the boom structure and out of engagement during lowering of the boom structure, and a ratchet and pawl assembly for maintaining said boom structure in a predetermined position.

8. A mobile lifting equipment as in claim 7 wherein said means for holding said nut stationary also includes an additional holding brake for retaining said lift supporting structure in a predetermined position.

9. In a mobile lifting equipment of the type including a wheeled vehicle having a frame, a lift supporting structure mounted on the frame, means for rotating the lift supporting structure about a vertical axis, a boom structure, means for pivotally mounting one end of the boom structure on the lift supporting structure, substantially rigid extensible means pivotally connected to the lift supporting structure and pivotally connected to the boom structure at a point spaced from the point at which the boom structure is pivotally connected to the lift supporting structure, means for causing operation of said extensible means to cause raising and lowering of the boom structure about the horizontal axis and means for rendering the means for operating the extensible means inoperative when the boom structure comes into engagement with an object during lowering of the same to prevent tipping over the mobile lifting equipment, said means for rendering said means for operating the extensible means inoperative including resilient means normally deformed beyond a predetermined amount during operation of said boom structure and being deformed to a lesser amount when said boom structure comes into engagement with an object, and means for sensing when the deformation is less than said predetermined amount.

10. Mobile lifting equipment as in claim 9 wherein the resilient means is associated with the extensible means.

11. In a mobile lifting equipment, a wheeled vehicle having a frame, a base plate, resilient mountings connecting said base plate to said frame, a lift supporting structure mounted on the base plate, means for rotating the lift supporting structure about a vertical axis, and a boom structure mounted upon the lift supporting structure, each of said resilient mountings including a support plate, a member of resilient material mounted upon the support plate and engaging the base plate, a rigid member affixed to the support plate and having its upper surface normally spaced from the base plate, and means securing the base plate to the support plate, said rigid member serving to prevent the compression of said member of resilient material beyond a predetermined amount.

12. In a mobile lifting equipment, a wheeled vehicle having a frame, a base plate, resilient mountings connecting said base plate to said frame, a lift supporting structure mounted on the base plate, means for rotating the lift supporting structure about a vertical axis, and a boom structure mounted upon the lift supporting structure, each of said resilient mountings including a support member affixed to said frame, a cylindrical member of resilient material mounted upon the support plate and engaging the base plate, a rigid cylindrical member affixed to the support plate and disposed within the resilient cylindrical member and having its upper surface normally spaced from the base plate, and means securing the base plate to the support plate and permitting vertical movement of the base plate with respect to the support plate, said rigid member serving to prevent compression of said cylindrical member of resilient material beyond a predetermined amount.

13. A mobile lifting equipment as in claim 12 wherein said means for securing said base plate to said support plate includes a bolt extending through the base plate and through the cylindrical rigid member, resilient means for connecting the bolt to the support plate and resilient means disposed in said cylindrical rigid member and surrounding said bolt.

References Cited by the Examiner
UNITED STATES PATENTS

| | | | |
|---|---|---|---|
| 1,478,793 | 12/23 | Osborne | 182—67 |
| 1,648,875 | 11/27 | Griese | 248—9 |
| 1,876,812 | 9/32 | Wiley | 248—9 |
| 2,376,875 | 5/45 | Honig | 182—66 |
| 2,450,152 | 9/48 | Miller | 182—2 |
| 2,614,743 | 10/52 | Arps | 182—66 |
| 2,828,095 | 3/58 | Beck | 248—9 |
| 2,896,750 | 7/59 | Eitel | 182—2 |
| 2,915,137 | 12/59 | Troche | 182—2 |
| 2,970,667 | 2/61 | Bercaw | 182—2 |
| 2,979,152 | 4/61 | Eitel | 182—19 |
| 3,043,445 | 7/62 | Holmes | 212—39 |

HARRISON A. MOSELEY, *Primary Examiner.*

G. LEO BREHM, REINALDO P. MACHADO,
*Examiners.*